(12) United States Patent
Gries

(10) Patent No.: US 8,684,389 B2
(45) Date of Patent: Apr. 1, 2014

(54) TOW HITCH

(75) Inventor: Thomas A. Gries, Solon, OH (US)

(73) Assignee: Buyers Products Company, Mentor, OH (US)

( * ) Notice: Subject to any disclaimer, the term of this patent is extended or adjusted under 35 U.S.C. 154(b) by 0 days.

(21) Appl. No.: 13/080,122

(22) Filed: Apr. 5, 2011

(65) Prior Publication Data

US 2011/0181022 A1   Jul. 28, 2011

Related U.S. Application Data

(63) Continuation of application No. 12/186,788, filed on Aug. 6, 2008, now abandoned.

(60) Provisional application No. 60/954,217, filed on Aug. 6, 2007.

(51) Int. Cl.
*B60D 1/06* (2006.01)

(52) U.S. Cl.
USPC ............... 280/461.1; 280/416.1; 280/512; 280/511; 280/515; 280/452; 280/454; 280/436; 280/437

(58) Field of Classification Search
USPC ........... 280/461.1, 416.4, 512, 511, 515, 452, 280/454, 436, 437
See application file for complete search history.

(56) References Cited

U.S. PATENT DOCUMENTS

| | | | | |
|---|---|---|---|---|
| 3,473,826 A | * | 10/1969 | Broocks et al. | 280/422 |
| 3,679,234 A | | 7/1972 | Colliau | |
| 3,801,134 A | * | 4/1974 | Dees | 280/416.1 |
| 3,922,006 A | | 11/1975 | Borges | |
| 3,963,264 A | * | 6/1976 | Down | 280/416.1 |
| 4,060,331 A | * | 11/1977 | Domer et al. | 403/130 |
| 4,232,877 A | * | 11/1980 | Milton | 280/416.1 |
| 4,248,450 A | * | 2/1981 | McWethy | 280/416.1 |
| 4,280,713 A | | 7/1981 | Bruhn | |
| 4,697,818 A | * | 10/1987 | Moore | 280/416.1 |
| D356,764 S | | 3/1995 | Thixton, Jr. et al. | |
| 5,725,229 A | * | 3/1998 | McWethy | 280/416.1 |
| 5,839,744 A | | 11/1998 | Marks | |
| 6,956,468 B2 | * | 10/2005 | Lee et al. | 340/431 |
| 7,044,494 B1 | | 5/2006 | Cowett | |
| 7,156,412 B2 | | 1/2007 | Anderson | |
| 7,347,440 B2 | * | 3/2008 | Shannon | 280/416.1 |
| 7,478,821 B2 | * | 1/2009 | Konsela | 280/416.1 |
| 7,637,525 B2 | * | 12/2009 | Rightmire | 280/480 |
| 7,661,694 B2 | | 2/2010 | Krespach et al. | |

* cited by examiner

*Primary Examiner* — Tashiana Adams
*Assistant Examiner* — Marlon Arce
(74) *Attorney, Agent, or Firm* — Renner, Otto, Boisselle & Sklar, LLP

(57) ABSTRACT

A tow hitch comprises an elongated tubular shank of rectangular cross-section having four side walls; and at least one tow ball mounted to an adjacent side wall of the shank with a mounting shank extending from a base of the tow ball through a first hole in the adjacent side wall and a second hole in a side wall opposite the adjacent side wall.

13 Claims, 7 Drawing Sheets

TOW HITCH

RELATED APPLICATIONS

This application is a continuation application of U.S. patent application Ser. No. 12/186,788 filed on Aug. 6, 2008 now abandoned which claims priority to U.S. Patent Application No. 60/954,217 filed on Aug. 6, 2007, which are both hereby incorporated herein by reference.

FIELD OF INVENTION

The present invention relates generally to devices and methods for towing a trailer behind a vehicle, and more particularly to tow hitches.

BACKGROUND OF THE INVENTION

Tow hitches are commonly used for towing one vehicle behind another. Such an assembly generally comprises a tow ball that is secured to the rear of a towing vehicle and a coupler or receiver for the tow ball that is attached to the trailer or vehicle to be towed.

Multi-ball tow hitches are disclosed in U.S. Pat. Nos. 3,922,006, 4,280,713, 4,248,450 and 5,839,744, and in U.S. Design Pat. No. 356,764. These tow hitches employ a four-sided tubular ball mount and multiple tow balls of different sizes that are welded to a side wall of the ball mount or attached by a threaded shank and nut.

Another tow hitch is disclosed in U.S. Pat. No. 7,044,494. In this hitch, different size balls are welded to respective side surfaces of a four-sided solid shank. The solid shank was considered necessary to satisfying higher capacity requirements, such as a ball/pintle capacity of at least 10,000 pounds in the tow hitch shown in the '494 patent. The solid shank contributed a substantial part of the overall weight of the tow hitch.

SUMMARY OF THE INVENTION

The inventor of the present invention recognized that significant weight reduction could be achieved by using a hollow tubular ball mount, but tests proved that known designs could not satisfy higher capacity requirements, such as a ball and/or pintle capacity of at least 10,000 pounds. The side wall of the tubular mount to which the pintle ball was attached was found to crumple when subjected to the higher loads. While the thickness of the side wall could be increased, this would lead to increased weight and thus suffer from the same problem arising from use of the solid shank.

The present inventor discovered that higher capacity could be obtained with a tubular ball mount if the pintle or largest ball of the tow hitch was provided with a mounting shank that extended through a hole in the immediately adjacent side wall of the tubular ball mount and also through a hole in the opposite side wall of the tubular ball mount. Preferably the holes receive the shank with a close fit. The ball may be secured in place by welding of the ball base and/or distal end of the shank to the respective side wall of the tubular mount. The tubular mount preferably is formed by one end of a single piece tubular shank sized to fit within a receiver tube on the towing vehicle.

Accordingly, the present invention provides a tow hitch comprising an elongated tubular mount of rectangular cross-section, the mount having four side walls; and at least one tow ball mounted to an adjacent side wall of the mount, the tow ball having a mounting shank extending from a base of the tow ball through a first hole in the adjacent side wall and a second hole in a side wall opposite the adjacent side wall.

In a preferred embodiment, the first and second holes receive the ball shank with a close fit.

The tow ball may be secured in place by welding of the ball base and/or distal end of the ball shank to the respective side wall of the tubular mount, or by a nut threaded onto a threaded distal end of the ball shank.

The tubular mount may be formed unitary with a shank configured at an end opposite the ball for receipt in a tow hitch receiver.

The tow hitch may include a spacer interposed between the adjacent side wall and the side wall opposite the adjacent side wall. The spacer preferably has a length corresponding to the distance between opposed inner surfaces of the adjacent side wall and the side wall opposite the adjacent side wall. The spacer preferably is tubular and surrounds an intermediate portion of the ball shank.

The foregoing and other features of the invention are hereinafter described with reference to the accompanying drawings.

BRIEF DESCRIPTION OF THE DRAWINGS

In the annexed drawings.

DETAILED DESCRIPTION

Figure 1:
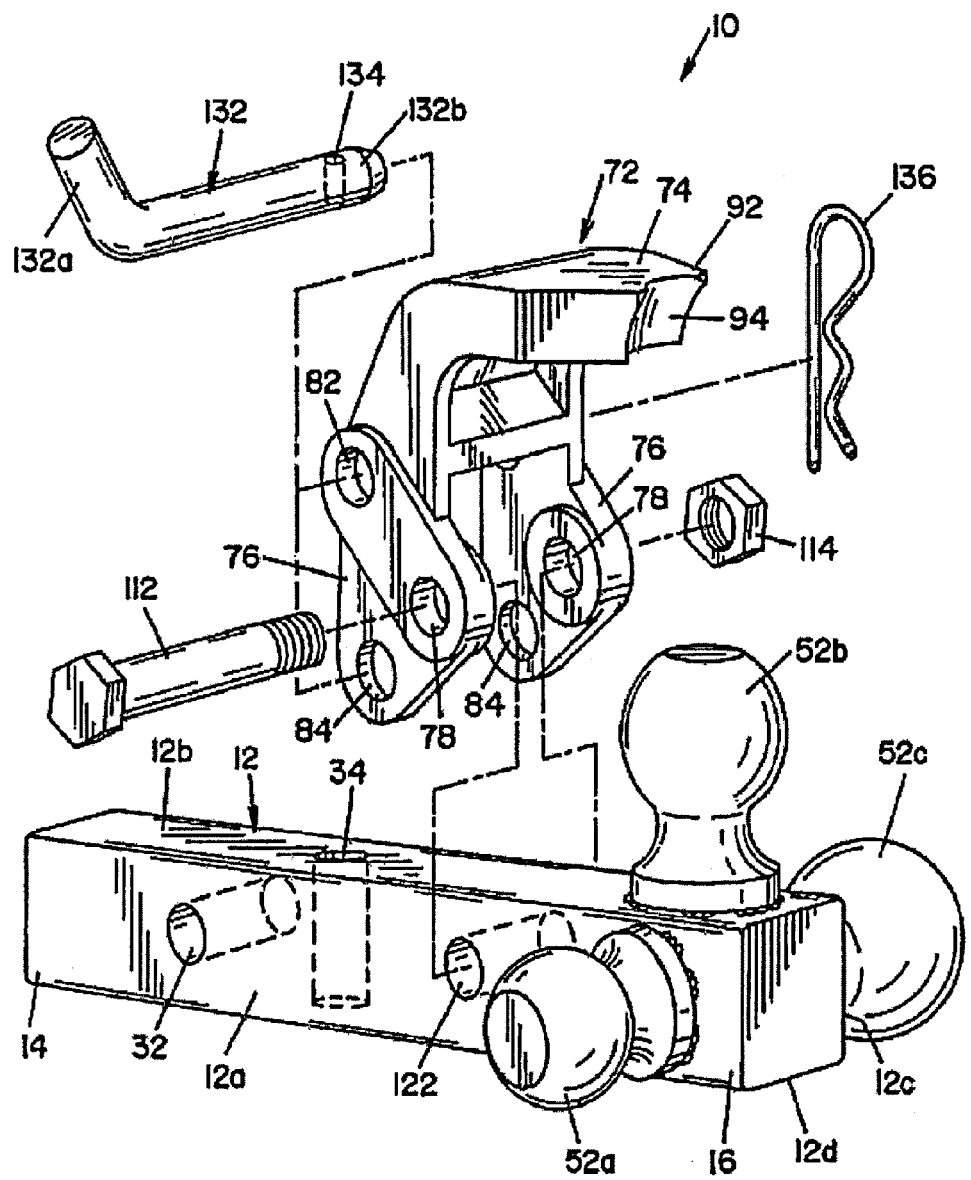
FIG. 1 is an exploded perspective view of a prior art tow hitch employing a solid shank.

Referring now to the drawings, FIG. 1 shows the tow hitch of U.S. Pat. No. 7,044,494, which is hereby incorporated herein by reference. The tow hitch 10 includes an elongated shank 12 having a first end 14 and a second end 16. The shank 12 has a rectangular cross-section and has a first side surface 12a, a second side surface 12b, a third side surface 12c, and a fourth side surface 12d.

Figure 2:
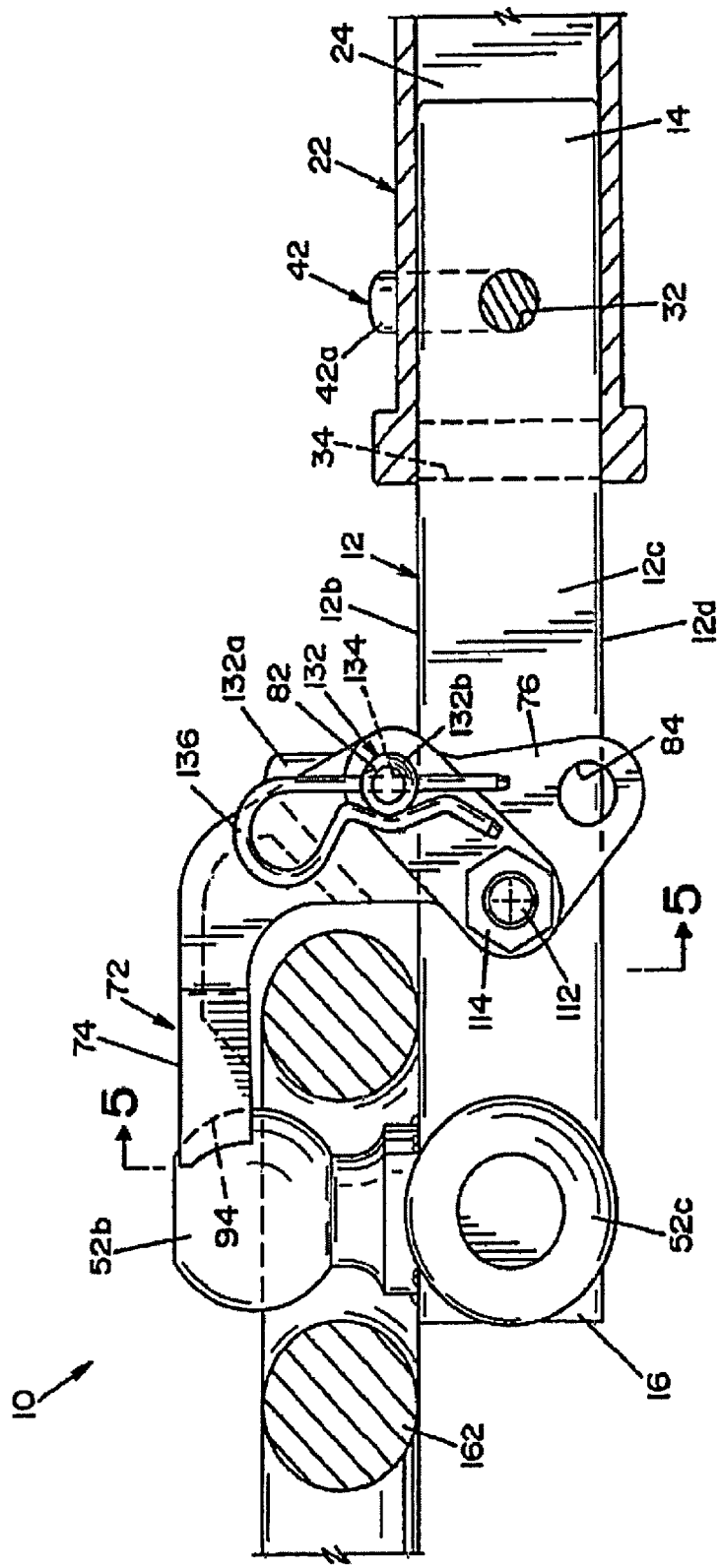
FIG. 2 is a side elevational view of a hitch assembly including the tow hitch of FIG. 1 and a receiver, partly broken away in section.

The first end 14 of shank 12 is dimensioned to be received within a receiving mount (receiver) 22, best seen in FIG. 2, that may be attached to a towing vehicle (not shown). The receiver 22, as shown, typically is a tubular structure having an opening 24 of rectangular cross-section extending therethrough. The receiver 22 is formed as part of a towing vehicle, or is secured to a towing vehicle in a conventionally known fashion.

The first end 14 of the shank 12 is dimensioned to be slidably received within opening 24 in receiving mount 22, as illustrated in FIG. 2. A first bore 32 extends laterally through the shank 12. The first bore 32 extends from the first side surface 12a to the third side surface 12c. A second bore 34 extends through the shank 12. The second bore 34 is offset from first bore 32 along the length of shank 12. The second bore 34 extends from the second side surface 12b to the fourth side surface 12d. The bores 32 and 34 are positioned through shank 12 to be alignable with openings in the receiver 22 depending upon the orientation of shank 12. A locking pin may be inserted through the aligned openings to secure the shank in the receiver.

Referring now to second end 16 of shank 12, a plurality of tow balls are joined to the shank 12. The tow balls 52a, 52b and 52c are sized differently to allow the tow hitch 10 to mate with differently sized couplers. Preferably, first tow ball 52a is coupled to the first side face 12a, the second tow ball 52b is coupled to the second side face 12b, and the third tow ball 52c is coupled to the third side face 12c on shank 12. Each tow ball 52a, 52b, 52c includes a spherical portion and a base portion. Each tow ball 52a, 52b, 52c is fixedly secured to the shank 12 preferably by welding.

A locking jaw 72 is pivotally mounted to shank 12. The jaw 72 is dimensioned to engage a tow ball, and to form a ring-retaining space between the shank 12 and the jaw 72. In this respect, the jaw 72 is generally "L" shaped and has a generally planar body portion 74 and two spaced-apart leg portions 76 that extend to one side of the body portion 74. In the embodiment shown, each leg portion 76 is essentially a mirror image of the other. Each leg portion 76 has a mounting hole 78 formed therethrough. The mounting opening in one leg portion 76 is axially aligned with the mounting hole in the other leg portion 76. Each leg portion 76 also includes a first locking hole 82 and a second locking hole 84. The first and second locking holes 82 and 84 on one leg portion 76 are aligned respectively with first and second locking holes 82 and 84 on the other leg portion 76.

The jaw 72 has a free end 92 that is formed to have a surface 94 to matingly engage one of tow balls 52, 52b, 52c. In the embodiment shown, surface 94 is a spherical surface and is dimensioned to matingly engage the spherical portion of tow ball 52b which typically will be the largest diameter ball.

The jaw 72 is dimensioned to be mounted to the shank 12 with leg portions 76 straddling shank 12. The jaw 72 is mounted to shank 12 by means of a hex-head bolt 112 extending through mounting openings 78 in leg portions 76, and through a mounting bore 122 in the shank 12. The bore 122 extends from first side surface 12a to third side surface 12c. A hex nut 114 maintains hex-head bolt 112 in place.

Figure 4:
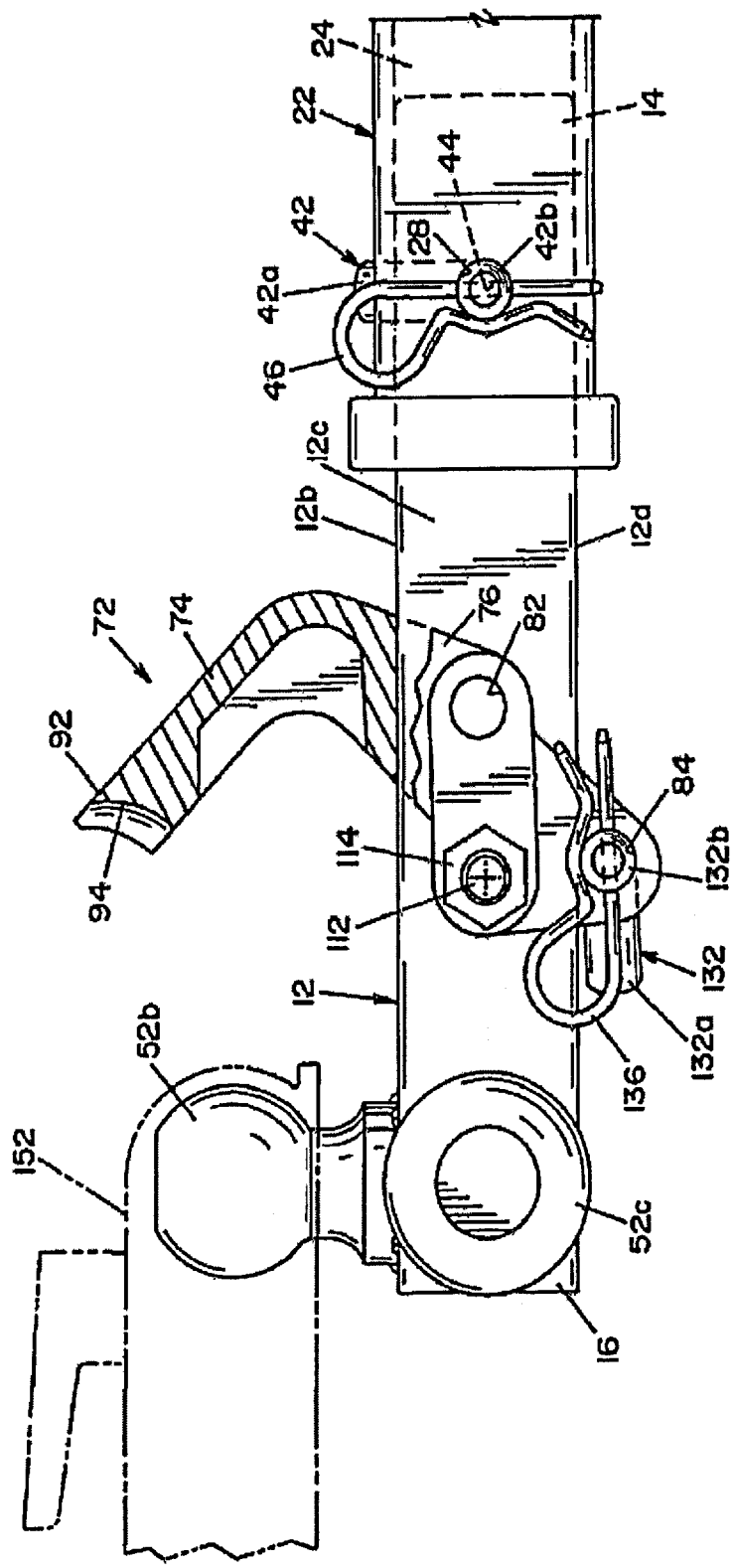
FIG. 4 is a side elevational view similar to FIG. 2, but showing a locking jaw in an open position.

The locking jaw 72 is movable between a first, ball-engaging position, seen in FIG. 2, and a second, opened position, seen in FIG. 4.

A locking pin 132 is provided for the locking jaw 72. The jaw 72 is locked in the first position by locking pin 132 extending through first locking holes 82 in jaw 72. The locking pin 132 has a first bent end 132a and a second end 132b with a hole 134 therethrough. The hole 134 in second end 132b of locking pin 132 is dimensioned to receive a conventional cotter pin 136, as illustrated in FIG. 2. In the position shown in FIG. 2, the locking pin 132 prevents clockwise rotation of the jaw 72 by engaging the side surface 12b of the shank 12. Engagement between the tow ball 52b and the surface 94 of the jaw 72 prevents counterclockwise rotation of jaw 72.

In the second position shown in FIG. 4, the locking pin 132 extends through the second locking holes 84 in the jaw 72. Rotation of jaw 72 in a counterclockwise direction about the axis of the bolt 112 is prevented by the locking pin 132 engaging the side surface 12d of the shank 12. Rotation of the jaw 72 in a clockwise direction is prevented by contact of the body portion 74 with the surface 12b of the shank 12.

The tow hitch 10 is capable of towing different trailer vehicles that may require different tow balls or a towing vehicle that is equipped with a towing ring or like arrangement. The tow hitch 10 is used by inserting the shank 12 into the opening 24 of receiving mount 22. If one of the tow balls 52a, 52b or 52c is to be used, the shank 12 is oriented within the receiver 22 to position the desired tow ball in a vertical position. If tow ball 52a or 52c is in use, the jaw 72 is preferably locked in the first position engaging the tow ball 52b. If tow ball 52b is to be used for coupling to a tow ball connector (shown in phantom and designated 152 in FIG. 4), the jaw 72 is moved and locked into the second, opened position by inserting the locking pin 132 through the second locking holes 84 in the leg portions 76 such that the locking pin 132 is disposed beneath the side surface 12d.

Figure 3:
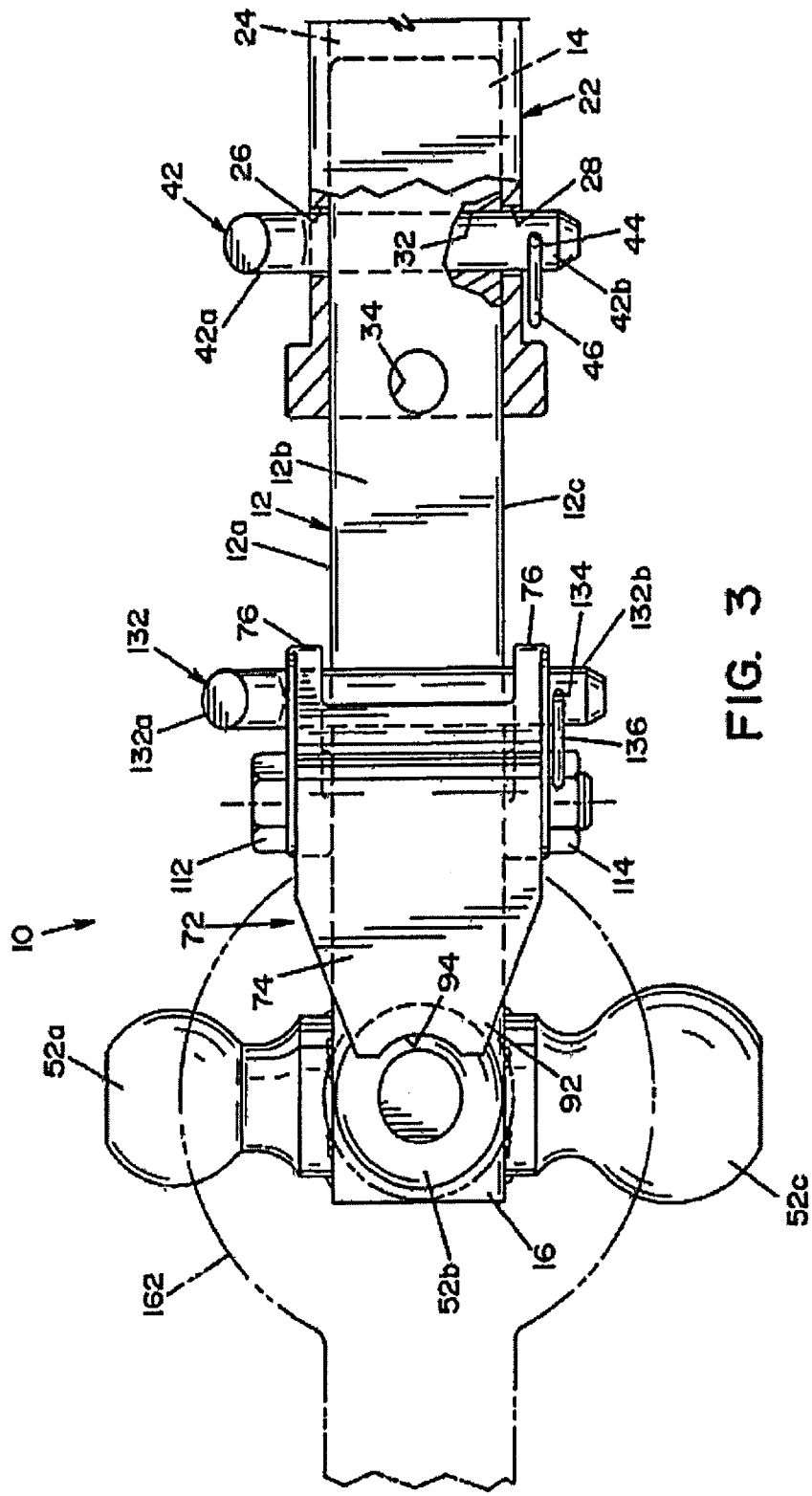
FIG. 3 is a plan view of the hitch assembly of FIG. 2, partly broken away in section.

If a Lunette eye or ring coupler (shown in FIGS. 2 and 3 and designated 162) is to be attached to the tow hitch 10, the jaw 72 is moved to a second position to allow the ring to be inserted over the second tow ball 52b, as illustrated in FIG. 4. The jaw 72 is then pivoted to where surface 94 abuts the spherical portion of the tow ball 52b. The jaw 72 is locked in this position by inserting the locking pin 132 through the first locking holes 82 of the leg portions 76 and inserting a cotter pin 136 into hole 134 of the locking pin 132 to thereby prevent removal of the locking pin 132. In this configuration, the tow ball 52b acts as a pintle for the ring or Lunette eye.

Figure 5:
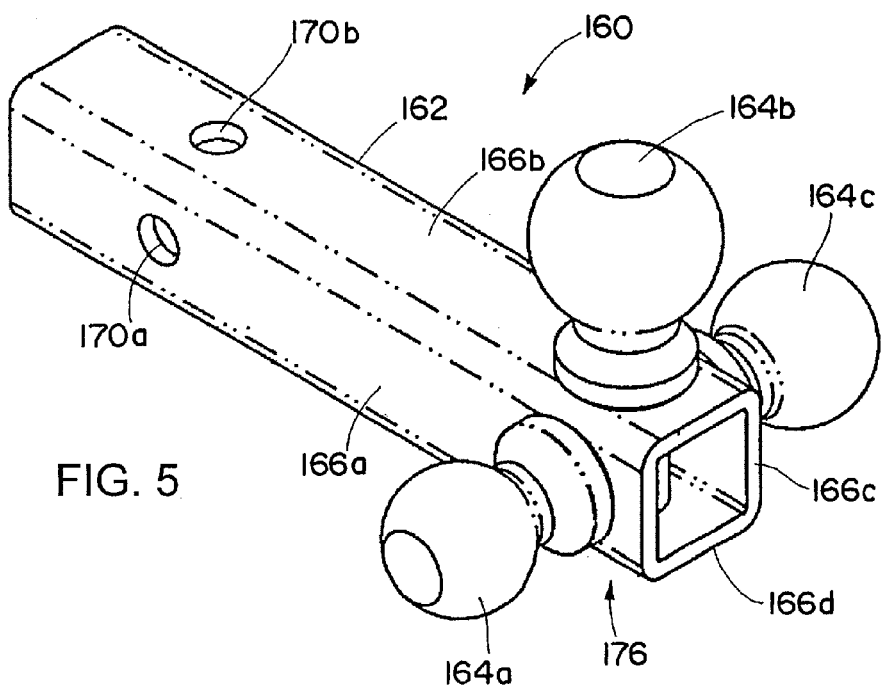
FIG. 5 is a perspective view of an exemplary tow hitch employing a hollow tubular shank in accordance with the invention.
Figure 6:
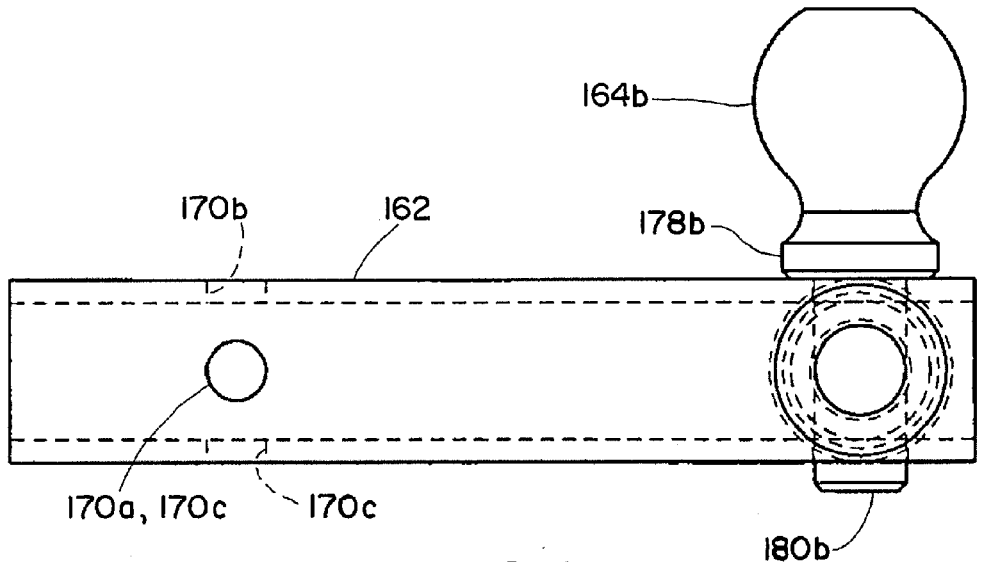
FIG. 6 is a side elevational view of the tow hitch of FIG. 5.
Figure 7:
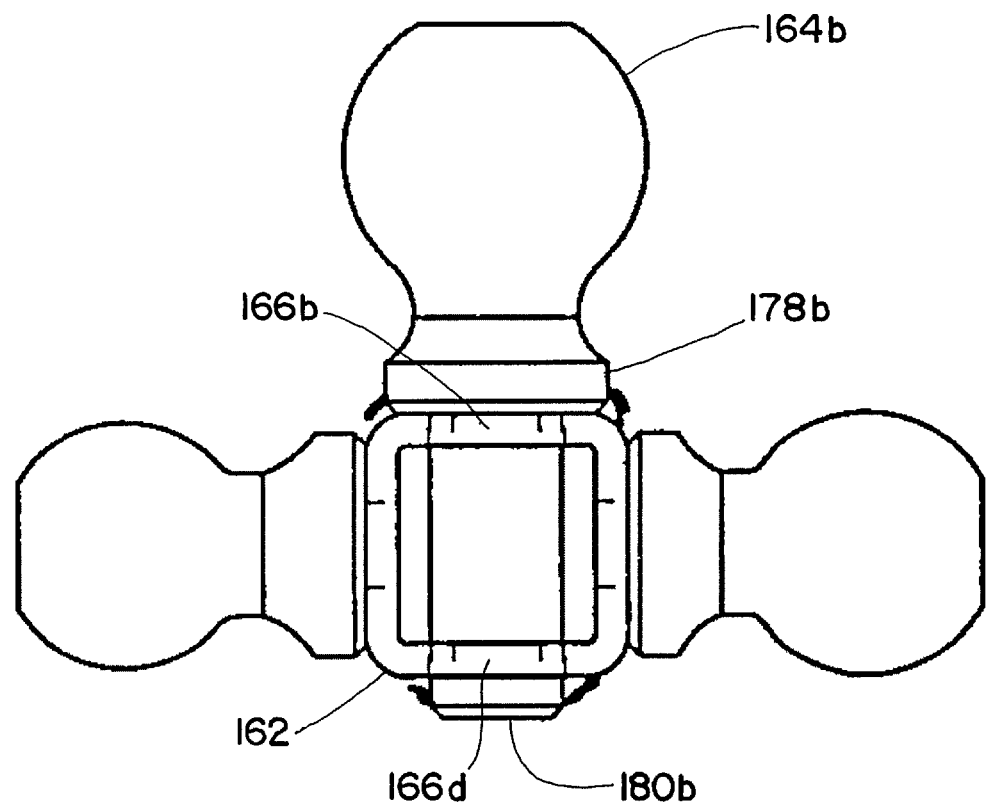
FIG. 7 is an end view of the tow hitch of FIG. 5.

Turning now to FIGS. 5-7, an exemplary tow hitch according to the present invention is designated generally by reference numeral 160. In its illustrated simplistic form, the tow hitch 160 comprises a tubular shank 162 to which one or more balls are secured. In the illustrated embodiment, three different size tow balls 164a, 164b and 164c are secured to respective side walls 166a, 166b and 156c of the tubular shank. The shank, which preferably is square in cross-section, has a further side wall 166d opposite side wall 166b.

In the illustrated simplistic form, the shank at its end opposite the balls is provided with lock pin holes 170a, 170b, 170c and 170d in respective side walls 166a, 166b, 166c and 166d. The holes 170a and 170c are aligned, as are the holes 170b and 170d. As above described, such an arrangement of holes enable the hitch to be secured in a receiver in one of several relatively rotated positions respectively positioning the balls at the top of the tow hitch. In FIGS. 5-7 the holes reside in the same transverse plane, but respective pairs could be offset as shown above in FIGS. 1-4. Accordingly, any one of the three balls can be selected for use.

In addition, the tow hitch may be configured with a jaw and other features of the tow hitch shown in FIGS. 1-4, as will be appreciated by those skilled in the art. The jaw would usually be used in relation to the largest diameter ball 170b for use with a Lunette eye or ring coupler as above described.

A significant difference between the tow hitch of FIGS. 1-4 and FIGS. 5-7 is that the mount 176 for the balls is tubular, and the ball 170b is secured to the mount in a unique manner. As shown and preferred, the tubular mount 176 may be formed by the end of the shank 162 which is preferably tubular along its entire length for reducing the weight of the tow hitch 160.

The tow balls 164a and 164c may be fastened to the tubular mount in a conventional manner, such as by welding the base 178a and 178c of each ball to a respective side wall 166a and 166c of the mount. The other tow ball 164b, however, is uniquely fastened to the tubular mount by means of a ball shank 180 that extends through a hole in the adjacent side wall engaged by the base 178b of the tow ball and also through an aligned hole in the opposite side wall 178d. Preferably the holes receive the ball shank with a close fit. The tow ball 164b may be secured in place by welding of the ball base 178b and/or distal end of the ball shank to the respective side wall of the tubular mount, this in effect creating an I-beam structure as shown in FIG. 6. The ball shank 180 may be unitary with the tow ball 164b, as by being formed from the same forging or casting, or it may be assembled to the tow ball.

Figure 8:
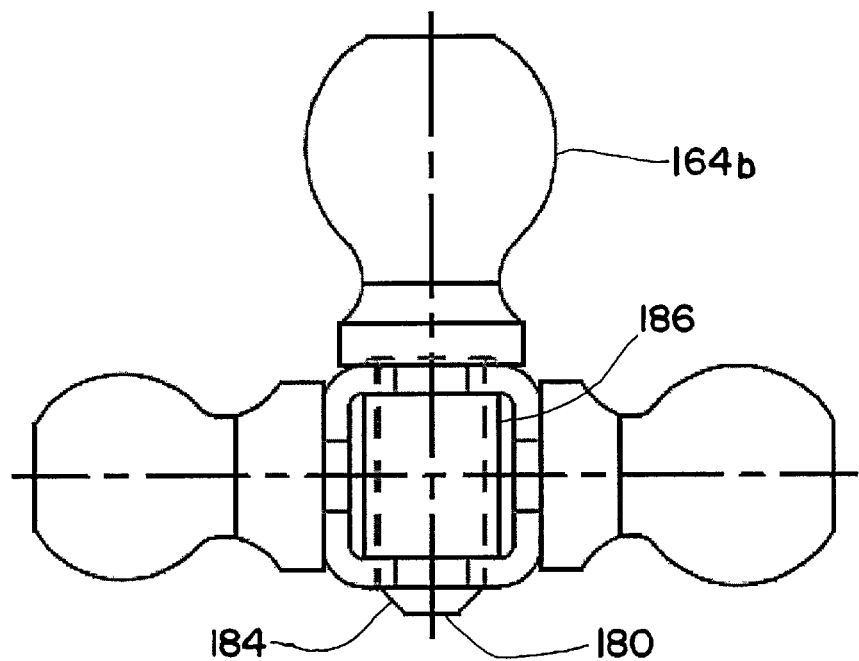
FIG. 8 is an end view similar to FIG. 7, with the tow hitch provided with an optional tubular spacer and with the end of the shank having a chamfer to facilitate welding.

As seen in FIG. 8, the distal end of the ball shank 180 may be provided with a chamfer 184 to facilitate welding. In addition, an intermediate portion of the ball shank 180 may be surrounded by a tubular spacer 186 positioned between the side walls through which the shank extends. The spacer preferably has an axial length corresponding to the spacing between the inner surfaces of the side wall to provide a close fit that serves to further rigidify the tubular mount and provide further resistance to collapse of the tubular mount under high loads.

Figure 9:
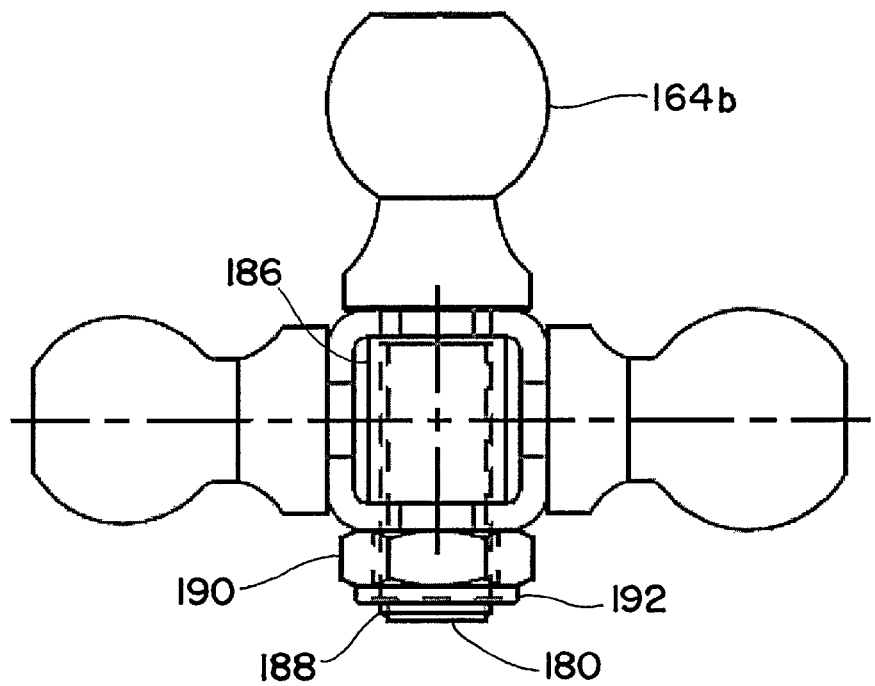
FIG. 9 is an end view similar to FIG. 8, but showing an alternative means for attaching the larger ball to the tubular mount.

Alternatively or additionally, the ball shank 180, as shown in FIG. 9, may have a threaded portion 188 extending beyond the opposite side wall and a nut 190 threaded thereon and tightened against the opposite side wall to hold the tow ball to the tubular mount. Again, the ball shank 180 may be surrounded by a tubular spacer 186 positioned between the side walls through which the shank extends. The spacer preferably has an axial length corresponding to the spacing between the inner surfaces of the side wall to provide a close fit that serves to further rigidify the tubular mount and provide further resistance to collapse of the tubular mount under high loads. The spacer also resists crushing of the tubular mount if a high torque is applied to the nut 190. To prevent loosening of the nut 190, a lock nut 192 may be threaded on the threaded end of the shank.

The foregoing manner of mounting the tow ball 164b has been found to allow for greater loads to be applied to the tow ball 164b, particularly when used as a pintle.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A tow hitch comprising an elongated tubular mount of rectangular cross-section, the mount having four side walls; and
   at least one tow ball mounted to an adjacent side wall of the mount, the tow ball having a mounting shank extending from a base of the tow ball through a first hole in the adjacent side wall and a second hole in a side wall opposite the adjacent side wall; and
   wherein the tow ball is secured in place by welding of the ball base to the adjacent side wall and by welding a distal end of the ball shank to the side wall opposite the adjacent side wall, in effect creating an I-beam structure.

2. A tow hitch as set forth in claim 1, wherein the first and second holes receive the ball shank with a close fit.

3. A tow hitch as set forth in claim 1, wherein the tubular mount is formed unitary with a shank configured at an end opposite the ball for receipt in a tow hitch receiver.

4. A tow hitch as set forth in claim 1, comprising a spacer interposed between the adjacent side wall and the side wall opposite the adjacent side wall.

5. A tow hitch as set forth in claim 4, wherein the spacer has a length corresponding to the distance between opposed inner surfaces of the adjacent side wall and the side wall opposite the adjacent side wall.

6. A tow hitch as set forth in claim 4, wherein the spacer is tubular and surrounds an intermediate portion of the ball shank.

7. A tow hitch comprising an elongated tubular mount of rectangular cross-section, the mount having four side walls; at least one tow ball mounted to an adjacent side wall of the mount, the tow ball having a mounting shank extending from a base of the tow ball through a first hole in the adjacent side wall and a second hole in a side wall opposite the adjacent side wall; and a spacer interposed between the adjacent side wall and the side wall opposite the adjacent side wall, the spacer having an axial extent parallel to the ball shank and surrounding an intermediate portion of the ball shank, and the spacer being greater in transverse dimension than the holes in the side walls whereby ends of the spacer abut inner surfaces of the adjacent side wall and the side wall opposite the adjacent side wall.

8. A tow hitch as set forth in claim 7, wherein the spacer has a length corresponding to the distance between opposed inner surfaces of the adjacent side wall and the side wall opposite the adjacent side wall.

9. A tow hitch as set forth in claim 7, wherein the spacer is tubular.

10. A tow hitch as set forth in claim 7, wherein the first and second holes receive the ball shank with a close fit.

11. A tow hitch as set forth in claim 10 wherein the first and second holes are of the same diameter.

12. A tow hitch as set forth in claim 11, wherein the tow ball is secured in place by welding of the ball base and/or distal end of the ball shank to the respective side wall of the tubular mount.

13. A tow hitch comprising an elongated tubular mount of rectangular cross-section, the mount having four side walls;
   a spacer interposed between the adjacent side wall and the side wall opposite the adjacent side wall; and
   at least one tow ball mounted to an adjacent side wall of the mount, the tow ball having a mounting shank extending from a base of the tow ball through a first hole in the adjacent side wall and a second hole in a side wall opposite the adjacent side wall; and
   wherein the tow ball is secured in place by welding of the ball base to the adjacent side wall and by welding a distal end of the ball shank to the side wall opposite the adjacent side wall, in effect creating an I-beam structure,
   wherein the first and second holes receive the ball shank with a close fit,
   wherein the tubular mount is formed unitary with a shank configured at an end opposite the ball for receipt in a tow hitch receiver.

* * * * *